United States Patent [19]
Castro

[11] Patent Number: 5,155,377
[45] Date of Patent: Oct. 13, 1992

[54] CHARGE DOMAIN DIFFERENTIAL CONDUCTANCE SYNAPSE CELL FOR NEURAL NETWORKS

[75] Inventor: Hernan A. Castro, Shingle Springs, Calif.

[73] Assignee: Intel Corporation, Santa Clara, Calif.

[21] Appl. No.: 821,634

[22] Filed: Jan. 16, 1992

Related U.S. Application Data

[63] Continuation-in-part of Ser. No. 747,642, Aug. 20, 1991.

[51] Int. Cl.$^5$ ............... H03K 19/0944; H03K 17/687
[52] U.S. Cl. ..................................... 307/201; 307/246; 307/584
[58] Field of Search ............... 307/201, 444, 490, 498, 307/501, 239, 246, 571, 577, 584

[56] References Cited

U.S. PATENT DOCUMENTS 5,083,044  1/1992  Mead et al. .................... 307/201 X Primary Examiner—David Mis
Attorney, Agent, or Firm—Blakely, Sokoloff, Taylor & Zafman

[57] ABSTRACT

A semiconductor charge transfer synapse cell has a capacitor coupled between an input line and an intermediate node. A voltage pulse applied to the input line causes charge transfer from one summing line to another through a pair of series connected field-effect devices. Each of the devices has an associated gate potential which controls its resistance. In response to the low-to-high voltage transition of the input pulse current flows through the devices from the intermediate node to the summing lines. A high-to-low transition causes current to flow in the opposite direction. Because the relative conductances of the devices are different depending on the direction of current flow, a net charge is transferred from one summing line to the other. The amount of charge transferred is a function of the amplitude of the pulsed input, the gate potentials, and the capacitance value.

24 Claims, 10 Drawing Sheets

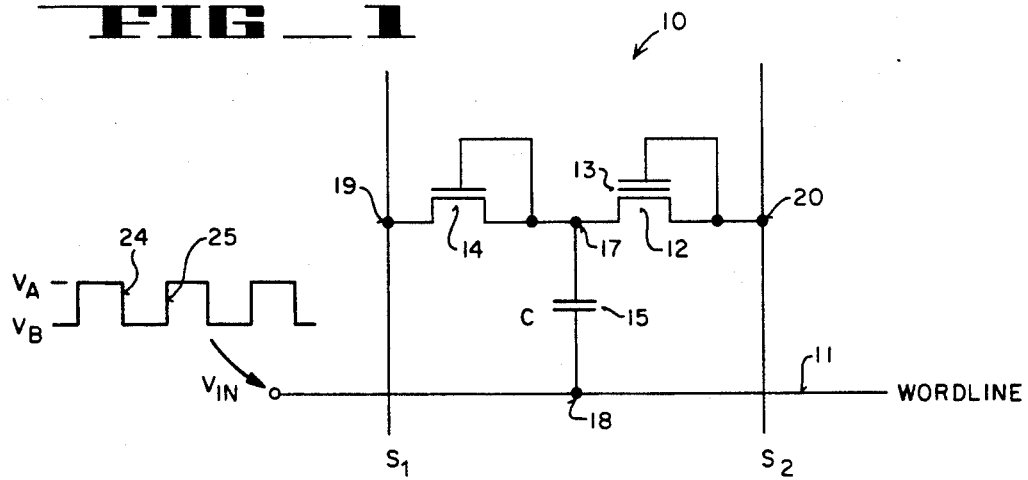
FIG_1
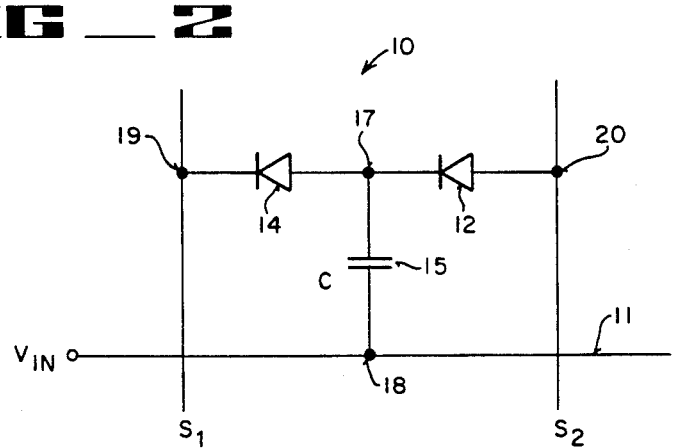
FIG_2
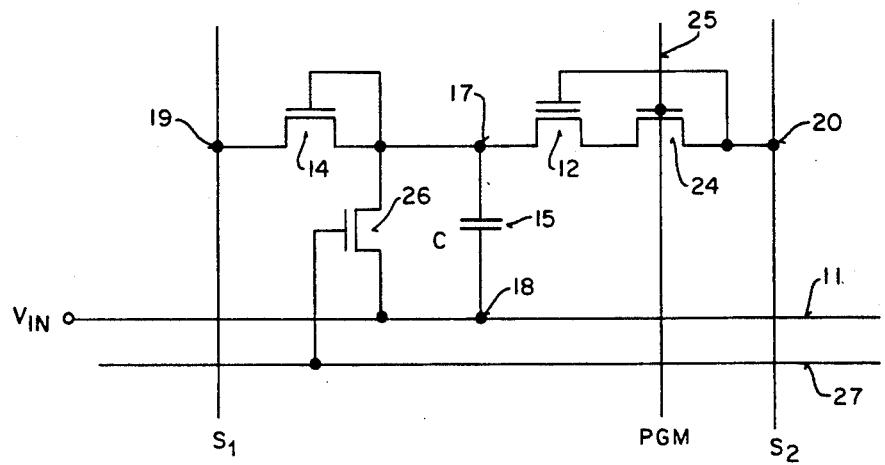
FIG_3

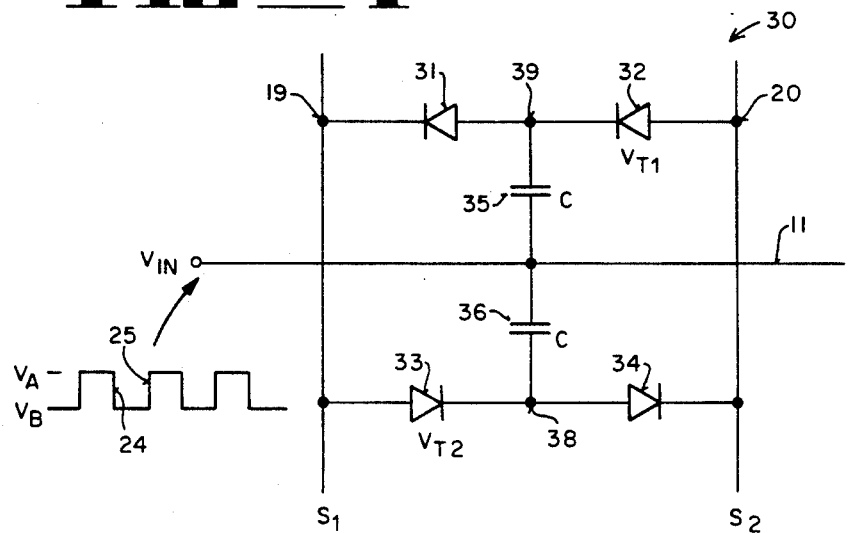
FIG_4
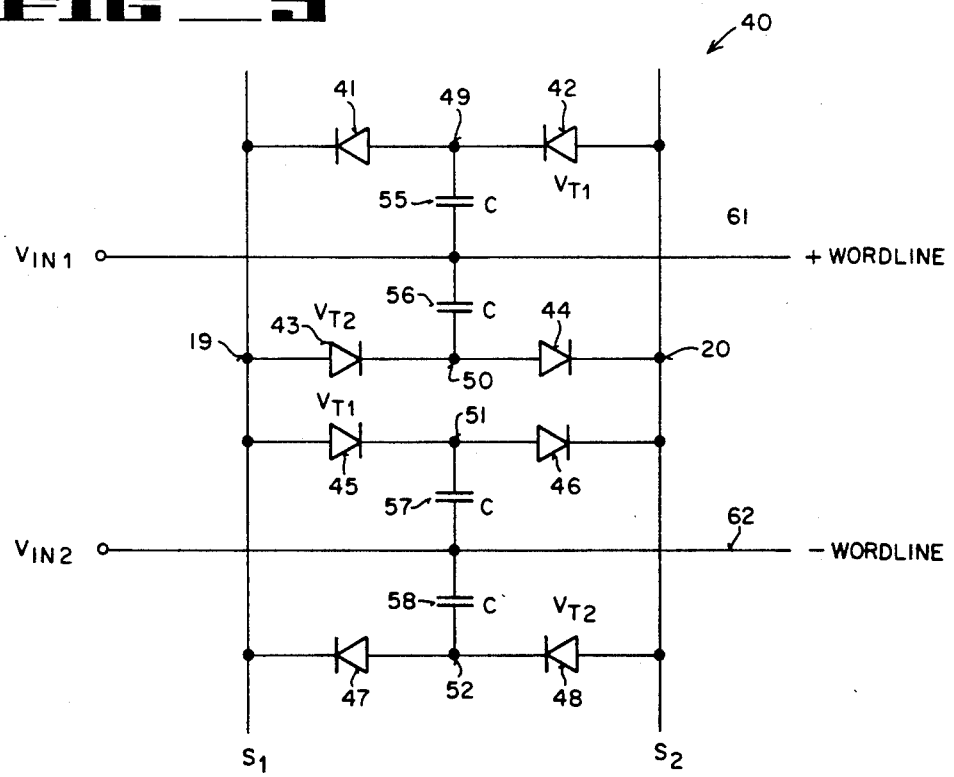
FIG_5

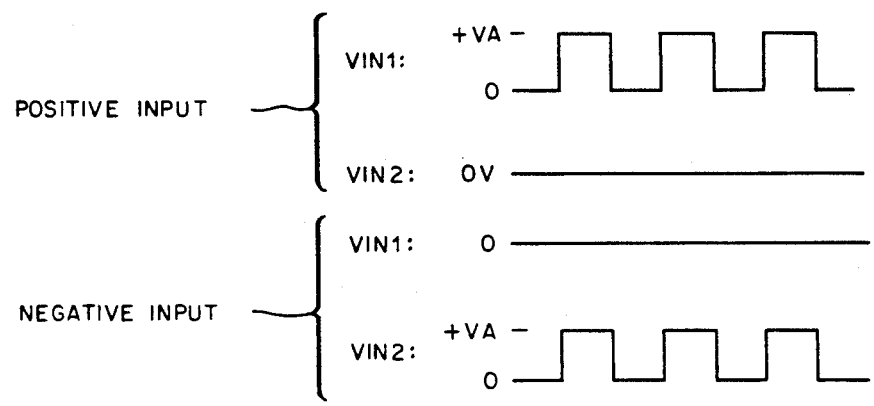
FIG_6
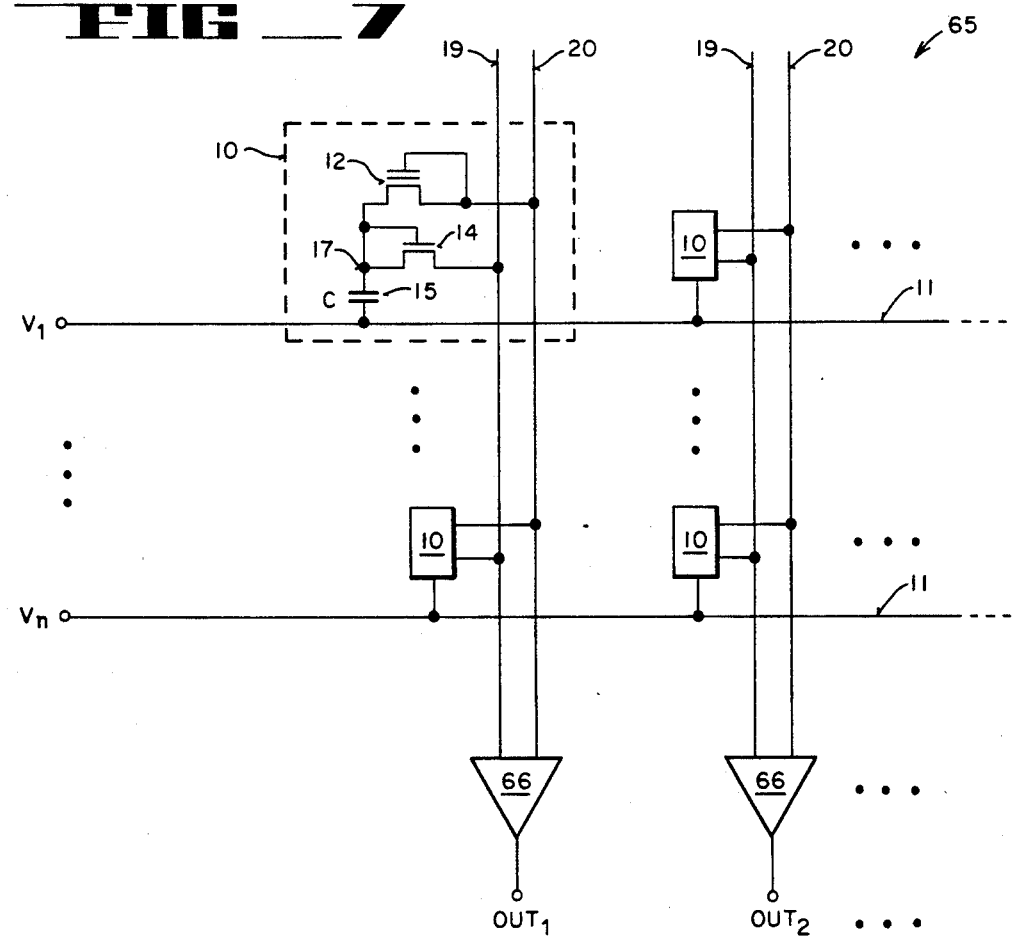
FIG_7

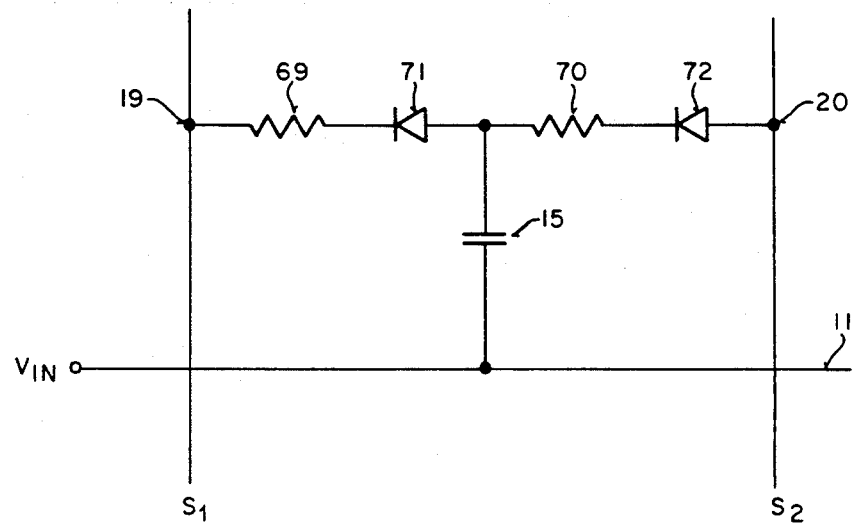
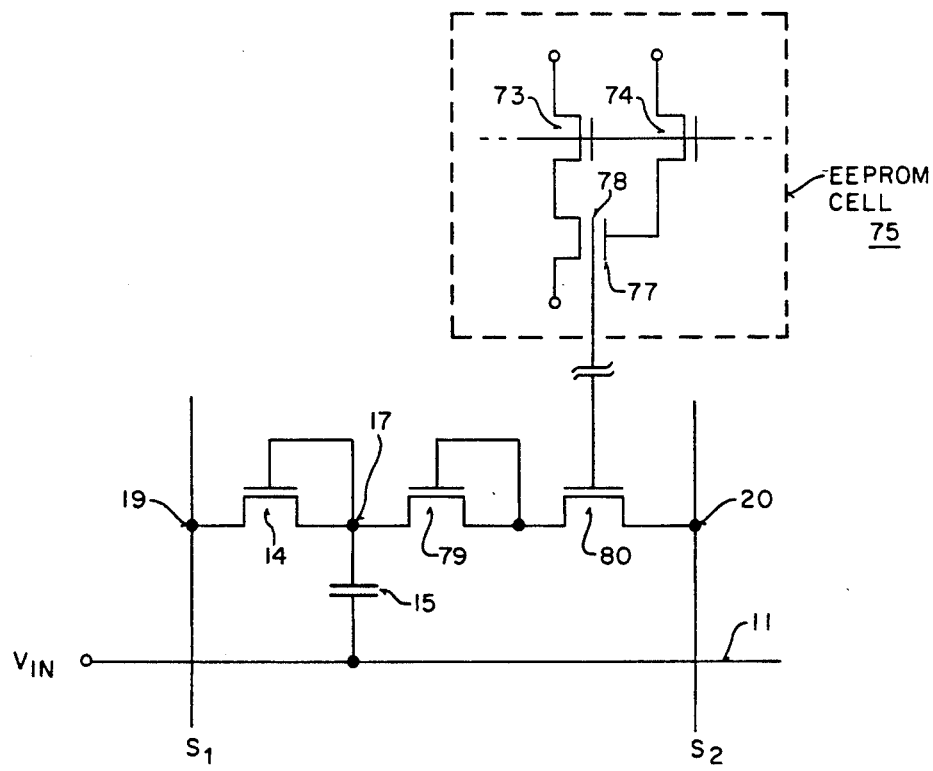

FIG_10
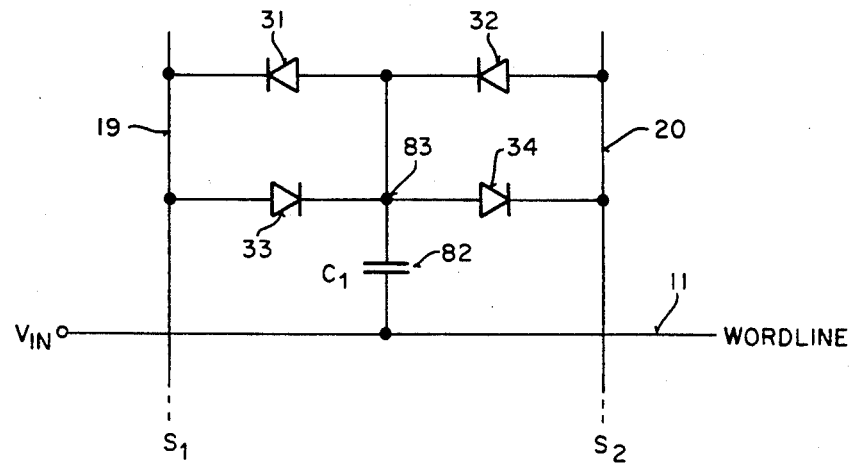
FIG_11
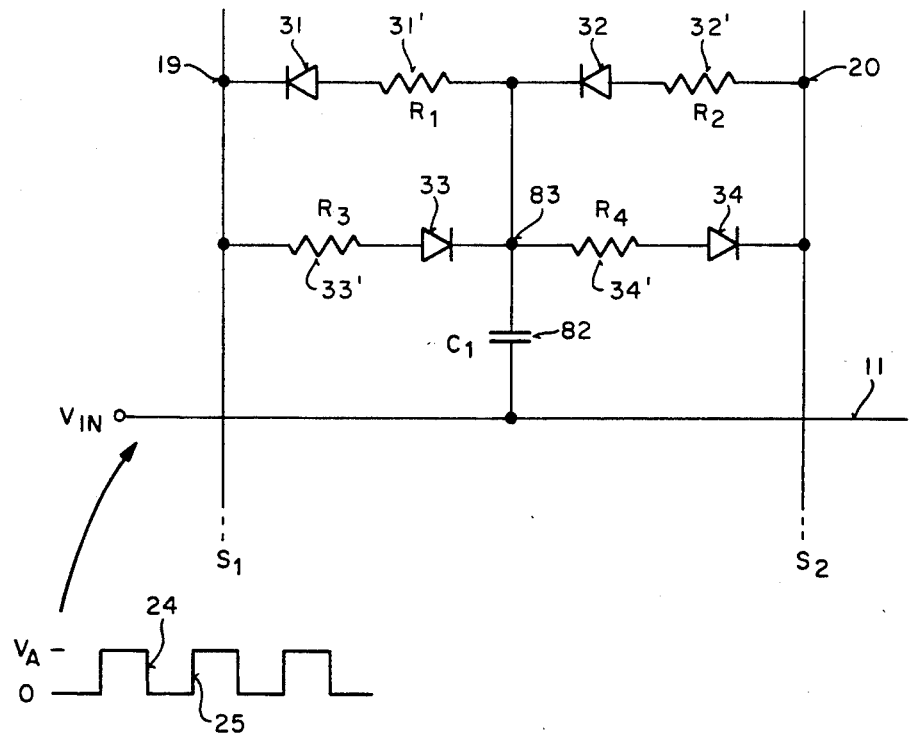

FIG_12
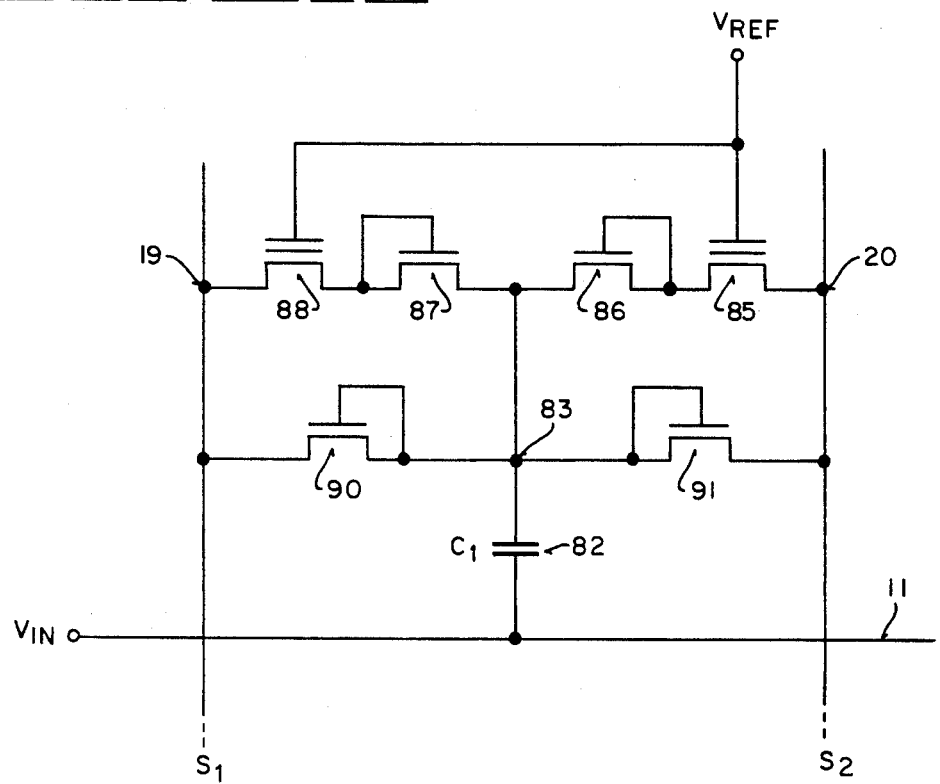
FIG_13
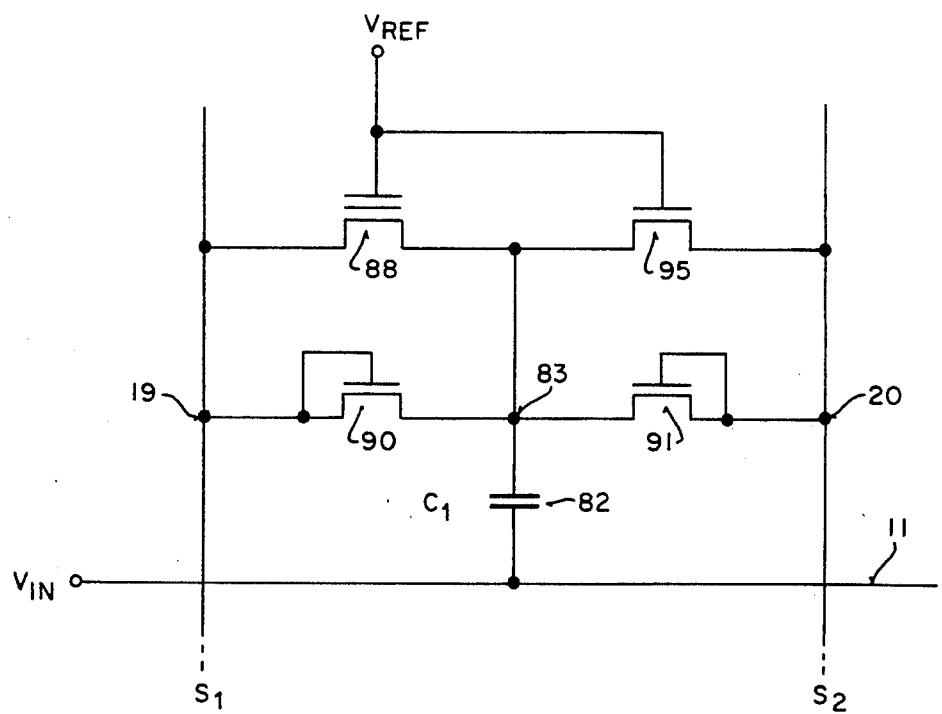

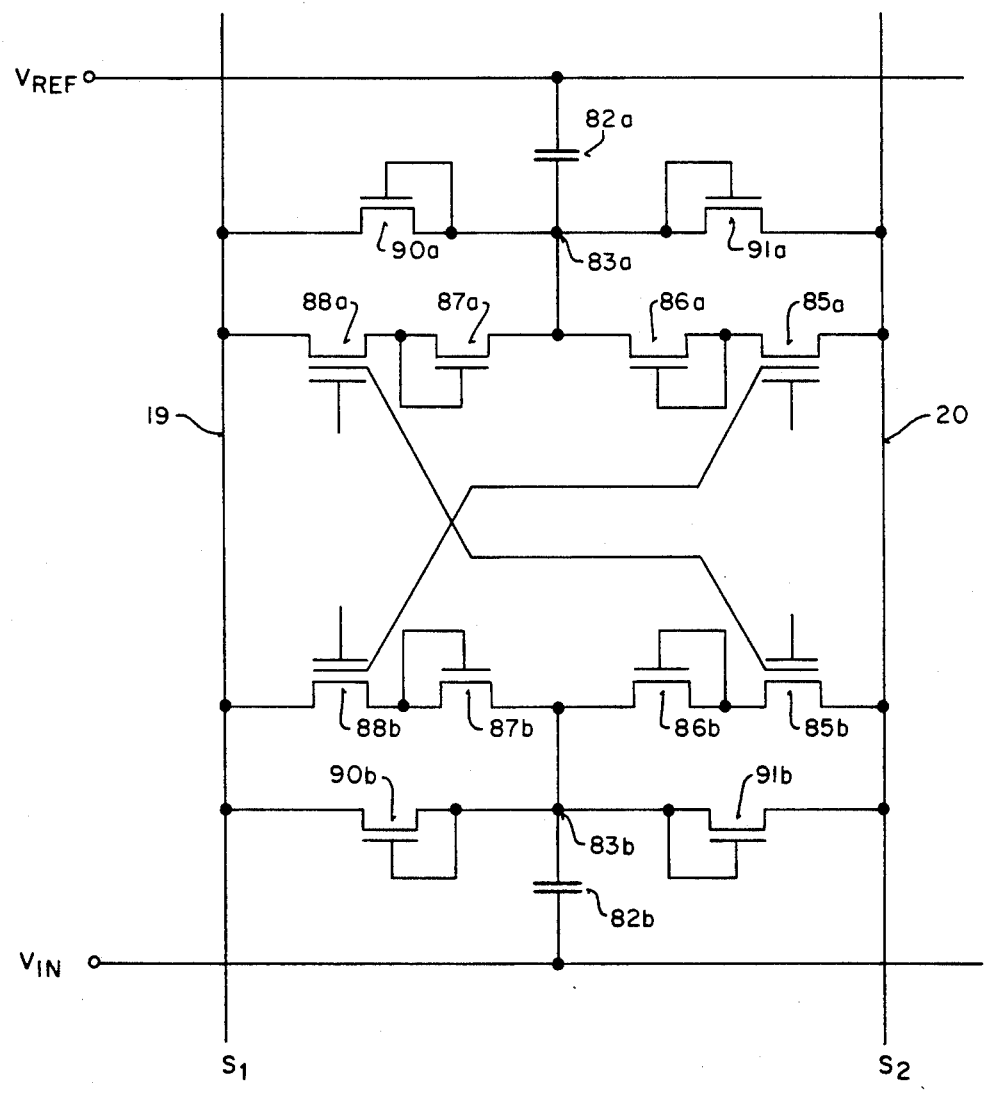
FIG_14

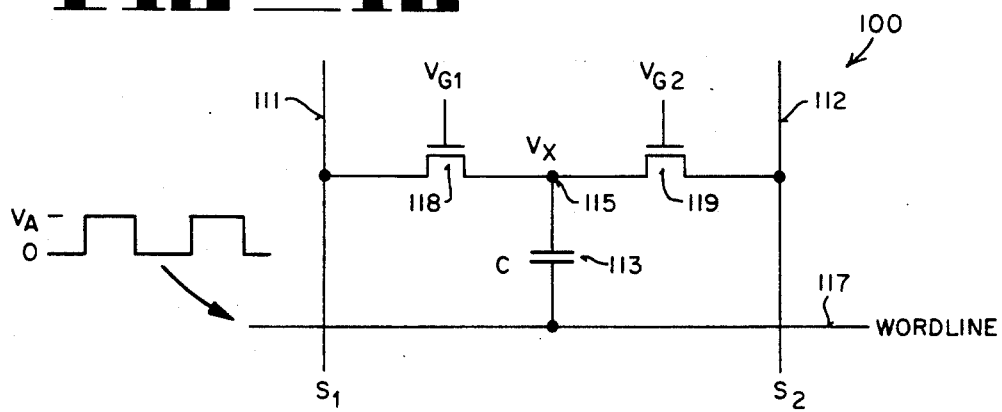
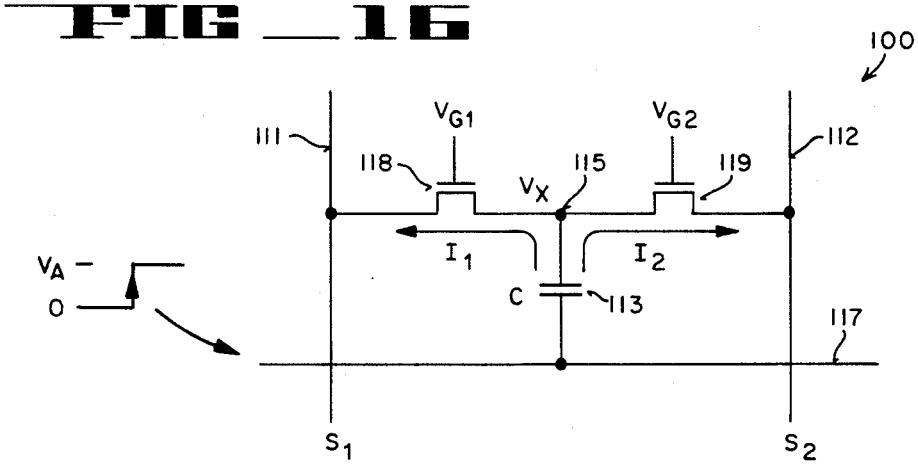
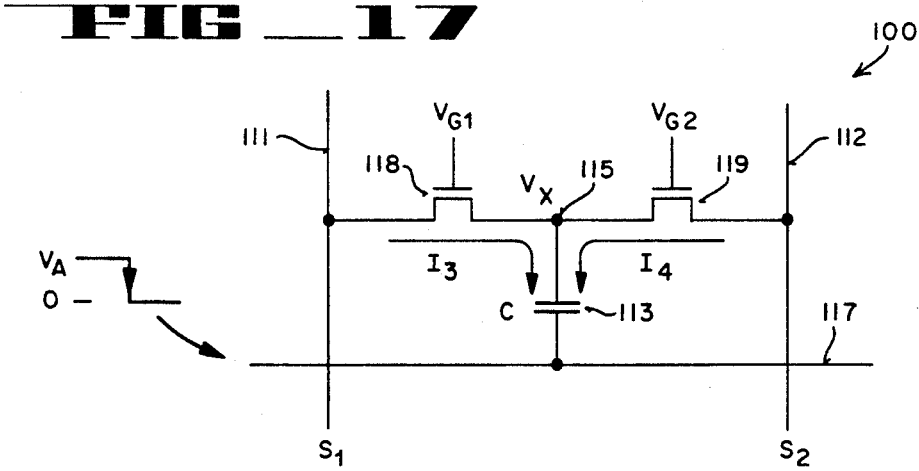

FIG_18
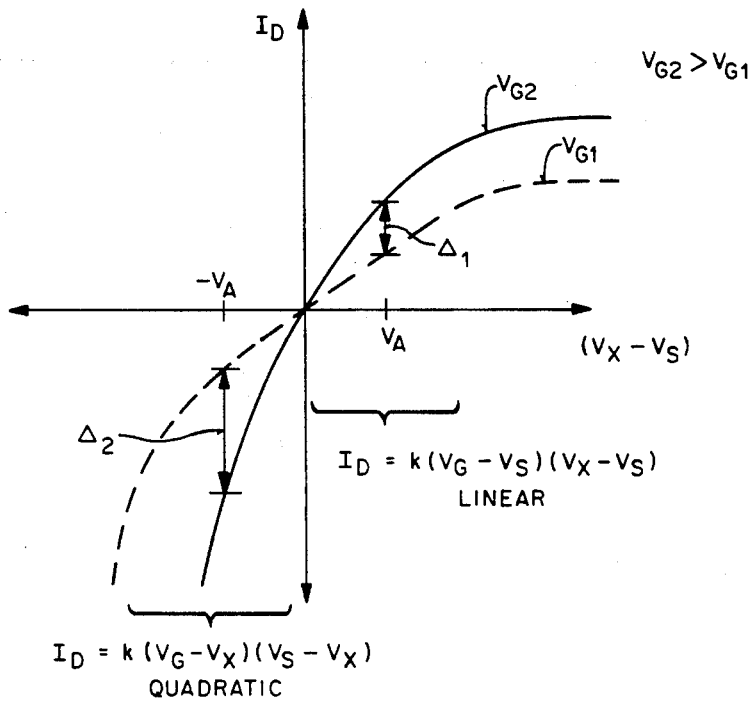
FIG_19
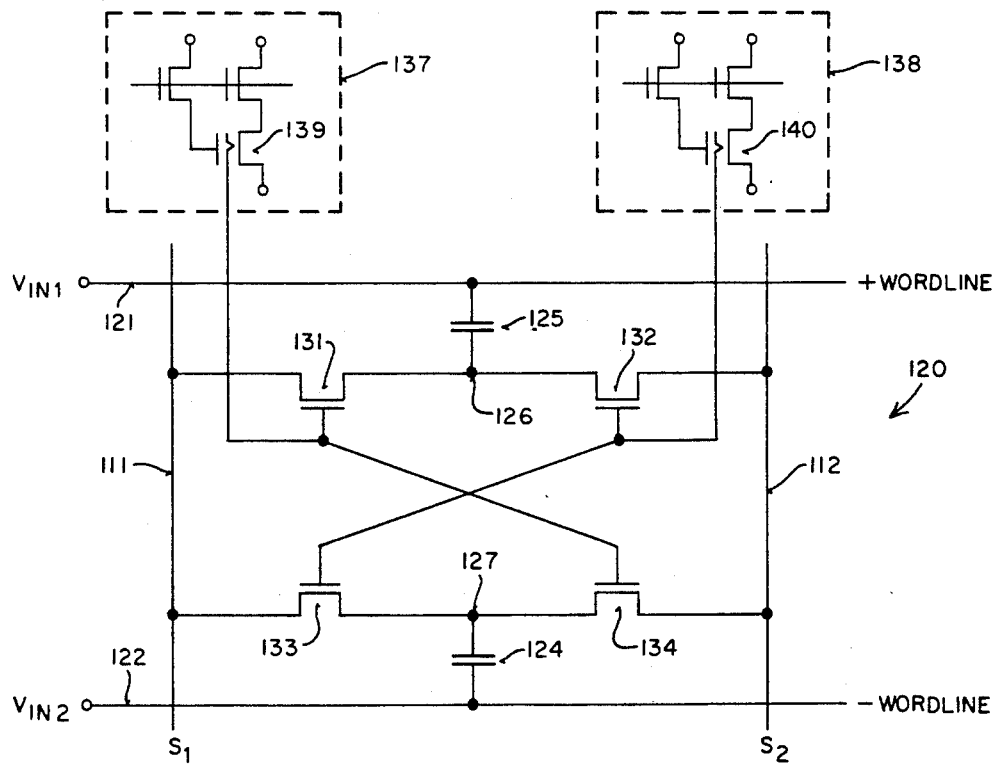

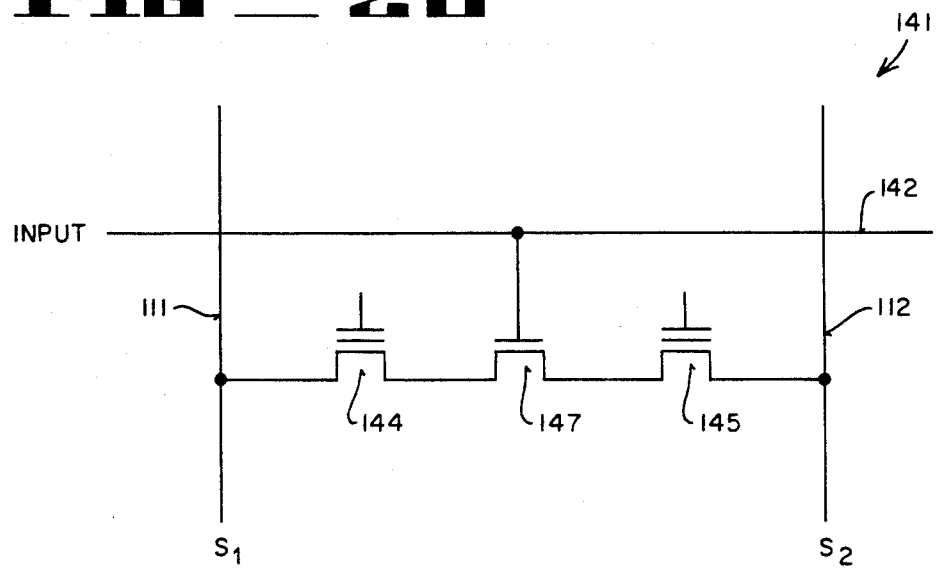
FIG_20
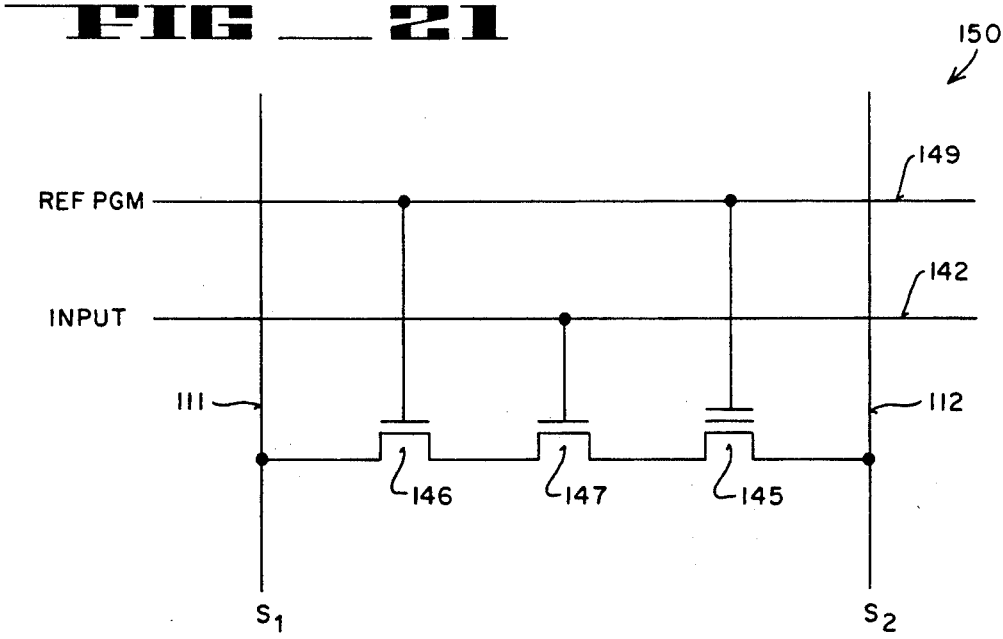
FIG_21

5,155,377

CHARGE DOMAIN DIFFERENTIAL CONDUCTANCE SYNAPSE CELL FOR NEURAL NETWORKS

RELATED APPLICATIONS

This is a continuation-in-part application of Ser. No. 747,642, filed Aug. 20, 1991, entitled, "Multi-Quadrant Charge Domain Synapse Cell," which is assigned to the assignee of the present invention.

FIELD OF THE INVENTION

The present invention relates to the field of neural networks for simulating processes that are thought to occur in the brain. More specifically, the invention pertains to semiconductor circuits utilized in neural networks for emulating the function of a biological synapse.

BACKGROUND OF THE INVENTION

Great strides have been made recently in the field of artificial intelligence toward developing electronic circuits which emulate higher order functions performed by the human brain and the brains of other animals. These circuits are commonly known as neural networks. They generally take the form of a matrix comprised of a set of horizontal lines which cross and are coupled to a set of vertical lines. The horizontal lines simulate the functions of axons in the cortex of the brain and provide the inputs to the network. The vertical lines simulate the function of dendrites. The vertical lines are terminated at summing devices which replicate the function of the soma, otherwise known as the neuron cell body. Examples of such networks can be found in U.S. Pat. Nos. 4,950,917; 4,906,865; and 4,904,881.

Within a neural network, electrical circuits are employed to model the function of a biological synapse. Collectively, these circuits provide a connection between the horizontal and vertical lines of the network. Individual synapse cells provide a weighted electrical connection between an input and summing element (i.e., a neuron body). The relative strength of the connection often changes during the training or learning process.

In earlier work, electrical synapse cells were implemented using ordinary digital resistors and/or digital-to-analog converters to provide the weighting factor or function. More recently, floating gate devices—which modulate current flow depending on the value of a stored charge—have been employed for this purpose. Examples of semiconductor synapse cells which employ floating gate devices in this manner are found in U.S. Pat. Nos. 4,956,564; and 4,961,002.

Electrical synapse cells may be either analog or digital in nature. For an analog implementation, the weighted sum of input signals is usually computed by summing analog currents proportional to the product of the inputs, with stored weights. In such a cell, considerations of cell size and resolution of the connection weight must be carefully balanced. Furthermore, in those types of networks which employ a pulsed analog input voltage, there is a need to maintain accurate frequency, amplitude, and duty cycle control of the analog input signal. At high frequencies, this is often difficult to achieve.

As will be seen, the present invention discloses a novel synapse cell which operates by transferring packets of charge between associated vertical dendrite lines. The invention has the advantage of inherently providing two-quadrant multiplication of an input vector and a stored weight, and can easily be adapted to four-quadrant multiplication. Moreover, the invented synapse cell benefits from a very low device count and is ideally suited for networks which implement the Sigmoid function as part of the summing process. The invented cell can operate in a continuous analog mode, or alternatively, it can operate digitally. Digital operation is useful for performing pattern recognition tasks and for computing results such as the Hamming distance between two binary patterns. The present invention also obviates the need for accurate control of input amplitude and duty cycle. Another advantage is that power dissipation can be much lower than current mode computation.

SUMMARY OF THE INVENTION

The present invention covers a semiconductor charge transfer synapse cell for use within a neural or associative network. The cell is preferably programmed to establish a weighted connection between an input vector applied to the network along a plurality of input lines, and a corresponding plurality of output summing lines coupled to neural summing devices.

In one embodiment, a capacitor is coupled between an input line and an intermediate node of the cell. The input lines delivers a pulsed input voltage to one terminal of the capacitor. In response to a low-to-high transition of the pulsed input voltage current flows through first and second field-effect devices (which may have associated floating gate elements) in a direction from the intermediate node to the respective summing lines. Upon the next high-to-low transition of the input pulse, current flows in the opposite direction from the summing lines to the intermediate node through the field effect devices. The relative conductances (due to a given gate-to-source potential) of the field-effect devices is different depending on which direction current is flowing. The result is that a net charge is transferred from one summing line to the other for each input voltage pulse transmittal. As long as the pulses exceed a certain minimum width, the magnitude of this charge is independent of the input duty cycle.

In accordance with the present invention, for fixed amplitude signals the magnitude of the total charge transferred is proportional to the number of pulses (or frequency) of the pulsed input and the associated gate potentials of each of the field-effect devices. In a preferred embodiment, at least one of the devices is realized with a floating gate field-effect device, wherein the gate potential of the device is programmed by transferring charge onto the floating gate member.

The basic charge transfer synapse cell is shown to be extendable to four-quadrant operation using a minimum number of devices. For four-quadrant multiplication, electrical charge is stored on the floating gate members of the various devices according to a predetermined pattern. The adopted pattern corresponds to the stored weight of the cell. In yet another embodiment, four-quadrant operation is accomplished using one and two quadrant multiplying synapses.

BRIEF DESCRIPTION OF THE DRAWINGS

FIG. 1 illustrates a basic one-quadrant electrical synapse cell.

FIG. 2 is an operationally equivalent circuit schematic diagram of the synapse cell shown in FIG. 1.

FIG. 3 shows the one-quadrant synapse cell of FIG. 1 with additional transistors incorporated to facilitate selective programming and erasing operations.

FIG. 4 illustrates an equivalent circuit schematic diagram which provides two-quadrant multiplication of an input voltage and a stored weight.

FIG. 5 illustrates an equivalent circuit schematic diagram of a four-quadrant synapse cell capable of multiplying a differential input with a stored weight. The output of the circuit of FIG. 5 is provided on a pair of output summing lines.

FIG. 6 illustrates one way of defining positive and negative inputs to the four-quadrant cell of FIG. 5.

FIG. 7 is a circuit schematic of a neural network utilizing an array of one-quadrant synapse cells.

FIG. 8 illustrates a one-quadrant synapse cell with programmable resistive elements.

FIG. 9 illustrates an alternative embodiment utilizing a fully decoded EEPROM cell to facilitate programming and erasing operations.

FIG. 10 shows an alternative embodiment of a two-quadrant charge-coupled synapse cell.

FIG. 11 shows an equivalent circuit schematic of the synapse cell of FIG. 10 with programmable resistive elements.

FIG. 12 shows one implementation of the synapse cell of FIG. 10 utilizing field-effect transistors.

FIG. 13 shows a simplified alternative embodiment of the synapse cell of FIG. 10, again utilizing field-effect transistors.

FIG. 14 is a circuit schematic diagram of a four-quadrant charge-coupled synapse cell formed as an extension of the cell of FIG. 12.

FIG. 15 is a simplified charge transfer synapse cell employing non-rectifying circuit elements.

FIG. 16 shows current flow through the cell of FIG. 15 in one direction in response to the low-to-high transition of a pulsed input.

FIG. 17 shows current flow through the cell of FIG. 15 in the other direction in response to the high-to-low transition of a pulsed input.

FIG. 18 is a plot illustrating the current-voltage characteristics of the field-effect devices in FIG. 15 for a given set of gate potentials.

FIG. 19 illustrates a circuit schematic diagram of a four-quadrant synapse cell formed as an extension of the two-quadrant cell of FIG. 15.

FIG. 20 is an alternative embodiment of the present invention employing a MOS capacitor.

FIG. 21 illustrates yet another alternative embodiment of the present invention which also employs a MOS capacitor.

DETAILED DESCRIPTION

A semiconductor synapse cell for implementing variable resistance connections between an axon and an input dendrite output is described. In the following description, numerous specific details are set forth, such as specific voltages, conductivity types, configurations, etc., in order to provide a thorough understanding of the present invention. It will be obvious, however, to one skilled in the art that these specific details are not essential to practicing the present invention. In other instances, well-known structures and circuits have not been shown or explained in detail in order to avoid unnecessarily obscuring the present invention.

The Basic Charge-Coupled Cell

Referring to FIG. 1, a one-quadrant charged coupled synapse cell 10 is shown. The basic operating premise of cell 10 is that charge is transferred from summing line $S_2$ to line $S_1$ through devices 12 and 14 in response to an input voltage signal $V_{IN}$, being applied to wordline 11. An array of individual cells 10 is commonly employed within a neural network to implement the multiplication between an input voltage vector and a stored weight matrix.

In the circuit of FIG. 1, device 14 comprises an ordinary n-channel field-effect device having its drain coupled to summing line $S_1$ at node 19, and its source coupled to an intermediate node 17. A capacitor 15 couples intermediate node 17 to node 18 of wordline 11. Similarly, device 12 comprises an ordinary floating gate field-effect device having its drain coupled to intermediate node 17 and its source coupled to node 20 of summing line $S_2$. The gate of device 14 is shown being coupled to intermediate node 17 while the control gate of floating gate device 12 is likewise coupled to node 20. Note that device 12 includes a floating gate 13 which is programmed to store a charge which controls the conductivity across the channel of device 12. This aspect of the invention will be discussed in more detail below.

All of the components of synapse cell 10 may be fabricated using a conventional metal-oxide-semiconductor (MOS) process flow. Capacitor 15 is preferably fabricated using first and second polysilicon layers. The first and second polysilicon layers form the respective plates of the capacitor with a silicon dioxide or equivalent dielectric layer providing an insulative layer between the polysilicon layers. Similarly, floating gate 13 is preferably fabricated from a first polysilicon layer. The control gate of device 12 is fabricated from a second polysilicon layer. It is appreciated that a variety of processing techniques and process flows may be employed to fabricate each of the components depicted in cell 10 of FIG. 1.

Functionally, devices 12 and 14 operate as equivalent diode means having programmable threshold voltages, as represented in FIG. 2. FIG. 8 shows another embodiment of cell 10 which utilizes programmable resistances 69 and 70 coupled in series with diodes 71 and 72. These resistors can simply be realized by the effective resistances of the MOS devices themselves, and can be used to further advantage as will be described shortly. The following example helps to explain the operation of the present invention.

With continuing reference to FIGS. 1 and 2, and ignoring the effect of series resistance for now, assume that field-effect device 14 is a zero-threshold device. In the configuration of FIG. 1 device 14 functions as a diode which permits current to flow from node 17 to node 19 only. Further assume that floating gate device 12 has not been programmed (e.g., its voltage threshold, $V_T$, is zero). As configured, device 12 functions as a zero-threshold diode coupling nodes 20 and 17. As a set of initial conditions, assume that a potential of about 2.0 volts is present at nodes 17, 19 and 20, and that the input voltage $V_{IN}$ coupled to wordline 11 is at a "high" voltage (e.g., $V_A = 2.0$ volts). Under these initial conditions there is zero charge across the plates of capacitor 15.

At high-to-low transition 24 of the input pulse train, node 18 drops to zero volts. By virtue of capacitor 15, the potential at node 17 also drops by an amount $V_A - V_B$. In this case, node 17 drops to zero volts. In response to the voltage drop experienced at node 17, charge flows from summing line $S_2$ (i.e., node 20) to intermediate node 17. Since we have assumed that floating gate device 12 has a threshold equal to zero volts, node 17 eventually charges back up from zero to two volts. When node 17 is at two volts, it again matches the column reference voltage present at node 20. Thus, after transition 24, and just prior to transition 25, a two volt difference appears across capacitor 15.

The quantity of charge Q transferred from line $S_2$ to node 17 is described by the equation $$Q = C(V_A - V_{T12}); V_A = V_{S2}$$

where C represents the capacitance of capacitor 15, $V_{S2}$ is the reference voltage associated with summing line $S_2$, $V_A$ is the amplitude of the $V_{IN}$ pulse, and $V_{T12}$ is the voltage threshold of floating gate device 12. In this example $V_{T12}$ is assumed to be zero. Note that in practice, the charge transferred is normally reduced by parasitic capacitance elements associated with node 17. However, this effect can be compensated for by simply increasing the amplitude of the input signal.

In response to low-to-high transition 25, the voltage at node 18 rises up to $V_A$ (e.g., 2 volts), wherein the voltage at intermediate node 17 is instantaneously driven to four volts. Assuming that summing line $S_1$ was also charged to an initial voltage of two volts, the difference in potential between nodes 17 and 19 causes charge to flow from node 17, through field-effect device 14, onto summing line $S_1$. Since device 14 is a zero-threshold device, charge will flow in the direction from node 17 to node 19 until the potential of these nodes is equal. To summarize this point, one cycle of the input $V_{IN}$ causes a charge Q to be transferred from line $S_2$ to line $S_1$ through devices 12 and 14.

More generally, assuming that the characteristic relaxation time of node 17 is much shorter than the pulse widths of the input signal, and given the following conditions, $$V_A < (V_{S1}, V_{S2}) < V_B$$

$$V_{T14} < V_{T12} < (V_A - V_B)$$

where $V_B$ is equal to the input pulse low level, then the charge transferred per cycle is given by the equation $$Q = C\{(V_{S2} - V_{T12}) + (V_A - V_B) - (V_{S1} + V_{T14})\}$$

This simplifies to the earlier equation for the case where $V_{S2} = V_{S1}; V_{T14} = V_B = 0V$.

A salient feature of the cell of FIGS. 1 and 2 is the fact that the configuration of devices 12 and 14 prevents charge from flowing from node 19 to node 17 or from node 17 to node 20 in response to a transition of the input $V_{IN}$. The reason why charge cannot be transferred under these conditions is because devices 12 and 14 are configured as equivalent diode means. The rectifying nature of these diodes prohibits current or charge flow in any direction except from summing line $S_2$ to summing line $S_1$.

It should be apparent that summing lines $S_1$ and $S_2$ can be treated as providing differential output lines for synapse cell 10. In this respect, perhaps the easiest circuit implementation is to maintain one of the summing lines at a constant voltage (e.g., $V_{S2} = 2$ volts) and allow the other summing line to rise or fall in response to the applied input voltage pulse train. More accurate summing is performed by also maintaining summing line $S_1$ at a constant voltage and integrating the charge. This way only one integration is required. Practitioners in the art will further appreciate that allowing the summing lines $S_1$ and $S_2$ to rise or fall in response to the applied input signal imposes an automatic squashing (e.g., Sigmoid) behavior. After a certain differential voltage is reached across summing nodes $S_1$ and $S_2$, increasing this differential voltage further becomes less efficient. (In most neural networks, the Sigmoid calculation is carried out after, and distinct from, the calculation of the sum of products.)

As previously discussed above, a packet of charge gets transferred from node 20 to node 19 with every cycle of $V_{IN}$. If the input is coded as a number of pulses N, or as a frequency, then the total charge transferred during a certain time period can be expressed mathematically by the equation $$Q_T = NC(V_A - V_{T12}); V_A = V_{S2}$$

where N is the number of pulses during the time period considered, $V_A$ is the amplitude of the input voltage pulse train, C is the capacitance associated with capacitor 15, $V_{S2}$ is the potential of line $S_2$, and $V_{T12}$ is the threshold of device 12. For this calculation, the weight can be defined as $$\text{Weight} = (V_A - V_{T12})$$

Thus, the described synapse cell calculates a product of the input times the weight. Note that summing lines $S_1$ and $S_2$ may be forced to a reference potential by means of an operational amplifier.

Conversely, the input can be coded as an amplitude with a fixed number of pulses or even a single pulse. In this case, $$Q/\text{pulse} = \left\{ \begin{array}{l} C(V_A - V_{T12}) \text{ if } V_A \geq V_{T12} \\ 0; \text{ otherwise} \end{array} \right\}; V_A < V_{S2}$$

The above mode of operation calculates a difference of the input amplitude $V_A$ and the stored weight $V_{T12}$ at every synapse. Difference calculating synapses of this type are required in certain neural network architectures.

When dual power supplies are employed, the restriction that $V_A < V_{S2}$ is removed. If $V_A$ exceeds $V_{S2}$ in a single operation, negative voltages below ground can be generated which could possibly activate parasitic bipolar devices within the circuits. Bipolar operation would interfere with proper synapse functionality.

Referring once again to FIG. 1, the amount of charge transferred from node 20 to node 17 during a high-to-low transition at the input is a function of the voltage threshold of floating gate device 12. In the earlier example, device 12 was assumed to have zero threshold voltage such that the charge transferred during transition 24 was simply proportional to the product of voltage $V_A$ and capacitance C. If we change the conditions in the above example and assume that device 12 has been programmed to some finite threshold voltage (e.g., $V_T = 0.5$ volts), then node 17 charges to a voltage reduced by that threshold voltage (e.g., $V_{17} = V_A - V_{T12} = 1.5$ volts). Hence, the voltage threshold of floating gate device 12 acts to reduce or limit the amount of charge transferred from node 20 to node 17 during a high-to-low transition of the input. Restated in different terms, the programmed threshold of device 12 establishes the stored weight of synapse cell 10.

Similarly, field-effect device 14 may also have a non-zero voltage threshold. Even further, it may comprise a floating gate device like device 12. It should be apparent that having a non-zero threshold device coupled between nodes 17 and 19 means that the amount of charge transferred in response to transition 25 will be limited. In other words, only a fraction of the charge on node 17 gets dumped onto line $S_1$ for this situation. The fractional amount of charge transferred is determined in part by the magnitude of the finite voltage threshold of device 14. For the case in which both devices are non-zero threshold devices, the net charge can be determined by either by both device thresholds.

Weight Setting

It should be understood at this point that each of the floating gate devices appearing in the various embodiments of the present invention are employed in some way for storage of a weight pattern—the pattern being itself represented by an electrical charge stored on the floating gate members of the devices. Weights may be either digital or analog in nature.

Recharging and discharging of the floating gate members takes place in a manner well known in the prior art. That is, programming and erasing typically take place by the dual mechanisms of hot-electron injection and Fowler-Nordheim tunnelling. By way of example, device 12 may be programmed by means of hot electron injection by raising the drain and control gate terminals to a high positive potential. A high positive voltage on the control gate of device 12 causes electrons to tunnel through the thin oxide nearest the drain for subsequent capture by floating gate 13, thereby raising (i.e., programming) its threshold.

Electrons may be removed from floating gate 13 by coupling the control gate of device 12 to a voltage potential near ground. The drain of device 12 is then taken to a high voltage while the source floats. The application of a high bias to the drain of floating gate device 12—at the same time its control gate is being grounded—causes electrons to tunnel from the floating gate to the drain. This reduces (i.e., erases) the threshold of floating gate device 12.

FIG. 3 illustrates the basic charge coupled synapse cell of FIG. 1 further incorporating a means for programming and erasing floating gate device 12. The additional means comprises an ordinary n-channel transistor 24 coupled in series between node 20 and floating gate device 12. An n-channel device 26 is also shown being coupled across capacitor 15 between nodes 17 and 18. Device 24 has its gate coupled to a programming line 25, while the gate of device 26 is coupled to a separate line 27.

During normal operation, line 27 is grounded and line 25 is raised to a high potential so that devices 24 and 26 are essentially removed from the circuits schematic of FIG. 3. For this situation, the circuit schematic of FIG. 3 reduces to the schematic of FIG. 1. During programming, line 25 is grounded such that device 24 disconnects the control gate of device 12 from its source/drain regions. This permits independent control of the control gate voltage via summing line $S_2$. Meanwhile, line 27 can be raised to a high potential to provide access to node 17 through device 26 and line 11.

A more direct approach to programming/erasing is illustrated in the circuit schematic diagram of FIG. 9. In FIG. 9, the threshold for the synapse is set by means of a fully-decoded EEPROM cell 75. Cell 75 includes a pair of transistors 73 and 74 which are utilized for selecting the drain and control gate of floating gate device 77 to program/erase floating gate 78. Floating gate 78 is coupled to (or commonly shared with) the gate of n-channel device 80. Device 80 and n-channel device 79 are shown connected in series between nodes 20 and 17. Collectively, devices 79 and 80 perform the same function as device 12 of FIG. 1. That is, the charge present on floating gate 78 represents the stored weight of the cell. Setting the threshold of device 78 also sets the threshold of device 80. At the same time, device 79 acts as a rectifier to prevent subsequent charge transfer back from node 17 to summing line $S_2$. In this implementation, $$V_{T12} = V_S - V_{FG}$$

It is appreciated that numerous alternative circuit configurations which provide a means for programming/erasing of floating gate device 12 are possible. Each is considered to be within the spirit and scope of the present invention.

Multi-Quadrant Operation

In each of the synapse cells discussed thus bar both the inputs and the weights have been defined as being positive only. That is, a single-ended input has been shown being applied to a cell for the purpose of transferring charge from one summing line to the other. As mentioned earlier, this type of operation is referred to as one-quadrant operation. To obtain multi-quadrant functionality that provides for both excitatory and inhibitory connections the basic synapse cell of FIG. 1 must be expanded, as discussed below.

FIG. 4 illustrates a two-quadrant synapse cell 30 comprising devices 31–34. Each of the diodes represented in FIG. 4 is preferably implemented utilizing field-effect devices in the same manner as shown in the embodiment of FIG. 1. In particular, diode elements 32 and 33 are intended to each have separately programmable voltage thresholds $V_{T1}$ and $V_{T2}$, respectively. The currently preferred embodiments of synapse cell 30 comprises two floating gate devices (i.e., devices 32 and 33) and two n-channel field-effect devices (i.e., devices 31 and 34). The connections of each of these transistors is consistent with the current charge flow direction indicated by the diodes and with the previous discussion.

In a two-quadrant implementation, the stored weight within the cell is defined to allow charge to flow in one of two possible directions—either from summing line $S_2$ to summing line $S_1$, or vice versa—depending on the value of the weight stored in devices 32 and 33. Treating the weight as a binary team, a positive weight may be defined as allowing charge to pass from $S_2$ to $S_1$. For this convention, a negative weight passes charge from $S_1$ to $S_2$. Positive and negative weights can also be defined if charge is allowed to flow across both halves of synapse cell 30 (top and bottom central, about line 11). In this latter case, the net charge transferred determines the weight. In a two-quadrant synapse cell the input is still defined as a positive, i.e., single-ended, value.

To better appreciate the operation of synapse cell 30, consider the following example in which a positive weight is arbitrarily defined by the condition wherein $V_{T1} < V_A$; $V_{T2} > V_A$. By default, a negative weight is where $V_{T2} < V_A$; $V_{T1} > V_A$. To simplify the analysis, again assume that devices 31 and 34 are zero-threshold devices. When wordline 11 drops in potential from $V_A$ to 0 volts at transition 24, a similar drop in potential is experienced at nodes 39 and 38. Ignoring initial conditions, a drop in potential at nodes 38 and 39 causes a proportional transfer of charge from nodes 20 and 19 to respective nodes 38 and 39. Upon low-to-high transition 25, this charge packet (or a fraction thereof) is transferred to either of summing lines $S_1$ or $S_2$, depending on whether a positive or negative weight pattern has been programmed into devices 32 and 33.

In accordance with the convention adopted above, if a positive weight has been programmed into cell 30, then low-to-high transition 25 produces a transfer of charge from node 39 to node 19. No charge transfer takes place from node 38 to node 20 since, for a positive weight, $V_{T2} > V_A$. Again, the programmed threshold $V_{T1}$ controls the amount of charge which is transferred from node 20 to node 39 in response to transition 24. Thus, a positive weight (as defined) only transfers charge from summing line $S_2$ to summing line $S_1$.

For a negative weight the condition is reversed; that is, charge is transferred from summing line $S_2$ to summing line $S_1$. For this situation, $V_{T1}$ is greater than $V_A$ and $V_{T2}$ is less than $V_A$ so that charge is transferred from node 38 to node 20 only. This charge transfer occurs in response to input voltage transition 25.

As before, and again ignoring initialization conditions, the total charge transferred during any time period can be calculated by the following relationships.

$Q_T = N^* C^* (V_A - V_{T1})$; (positive weights)

$Q_T = -N^* C^* (V_A - V_{T2})$; (negative weights)

Synapse cell 40 of FIG. 5 illustrates a circuit configuration cell which achieves four-quadrant operation. In a four-quadrant cell, positive and negative weights are both defined in the same way as for the two-quadrant cell 30 of FIG. 4. Additionally, both positively defined and negatively defined inputs are allowed.

With continuing reference to FIG. 5, four-quadrant charge domain synapse cell 40 comprises devices (e.g., equivalent diode elements) 41–48 and capacitors 55–58, arranged as shown between summing lines $S_2$ and $S_1$ and positive and negative wordlines 61 and 62, respectively. Devices 41–44 and capacitors 55 and 56 are preferably configured in the same manner as is shown in synapse cell 30 of FIG. 4. In other words, device element 41 is coupled between node 19 and node 49; device element 42 is coupled between node 49 and node 20, device element 44 is coupled between node 20 and node 50; and device element 43 is coupled between node 50 and node 19. Capacitor 55 couples wordline 61 to node 49, while capacitor 56 couples wordline 61 to node 50.

The bottom portion of cell 40 comprising devices 45–48 and capacitors 57 and 58, is simply a mirror-image of the top portion described above. Diode 46 is shown connected between node 20 and node 51; device element 45 is connected between node 51 and node 19; diode 47 is connected between node 19 and node 52; and device element 48 is connected between node 52 and node 20. Capacitors 57 and 58 couple wordlines 62 to nodes 51 and 52, respectively. As was the case in the two-quadrant cell, devices 42, 43, 45 and 48 each comprise a programmable element—preferably a floating gate device. For a digital implementation in which both positive and negative weights are stored within cell 40, devices 42 and 45 are programmed to the same voltage threshold $V_{T1}$. Likewise, devices 43 and 48 are programmed so as to have the same voltage threshold $V_{T2}$. To simplify the discussion, assume that positive and negative weights are defined as previously discussed in connection with cell 30 of FIG. 4.

Consider the operation of synapse cell 40 in view of the positive and negative input voltage conditions illustrated in FIG. 6. According to the convention of FIG. 6, a positive input is defined by the condition wherein wordline 62 is grounded and wordline 61 receives the input voltage pulse train $V_{IN1}$, as shown. For the case of a negative input this condition is reversed; that is, wordline 61 is grounded and a input voltage pulse train is applied to wordline 62. Whenever one of the wordlines 61 or 62 is grounded, no charge transfer or current flow takes place through the components associated with that half of the cell. Effectively, this portion of cell 40 is disabled or turned off. The other half of the cell receiving the input pulse train continues to operate in accordance with the principles described above in connection with the two-quadrant cell.

Thus, positive and negative inputs can also be defined with both inputs active. In this situation, a difference in the input frequencies determines whether the input is positive or negative. Alternatively, the number of pulses per fixed time period can be used to determine the sign of the input. A high frequency at $V_{IN1}$ relative to $V_{IN2}$ might be defined as a positive input, and vice versa. Note that this approach allows for the utilization of a constant reference frequency applied to on of the input lines. Input frequencies above or below this reference would then represent either a positive or a negative input. Thus, a column of four-quadrant synapse cells 40 can be employed to calculate the vector inner product between an input pattern and a stored weight pattern. The analog charge difference generated between summing lines $S_1$ and $S_2$ would be directly related to the strength of the match between the input vector and stored weight pattern in such an array.

Practitioners will further appreciate that the synapse cell of FIG. 5 performs an EXCLUSIVE-OR function—wherein a binary, digital input and a binary, digital weight are combined to produce an EXCLUSIVE-ORed binary, digital output.

Obviously, the cell of FIG. 5 can also be operated in an analog mode. For analog operation, the frequency (and/or amplitude) of the inputs varies over a continuous range of values. The programmed threshold voltages of devices 41–48 would also take on non-discrete values. It should be clear that numerous alternatives embodiments incorporating different input coding schemes or programming arrangements are possible. Each is considered to be well within scope of the present invention.

Consistent with the convention defined above for the synapse cell of FIG. 5, notice that the physical layout of synapse cell 40 on a semiconductor substrate may be optimized so that devices 42 and 45 share a common floating gate member. From a processing standpoint, this can be done by simply patterning the polysilicon layer, which forms the floating gates, into a single member coupled between the respective devices. Similarly, devices 43 and 48 can be fabricated so that they too share a common floating gate member. This type of arrangement could be advantageous in certain embodiments since only one programming means would be required to program the devices sharing the same floating game.

Incorporation Within A Network

FIG. 7 illustrates how a basic synapse cell 10 is preferably incorporated within a larger network array 65. Array 65 comprises a plurality of wordline inputs 11 coupled to receive input voltages $V_1$ through $V_{IN}$. Each of the input wordlines 11 is coupled through synapse cells 10 to a set of paired column summing lines 19 and 20. Each of the column summing lines 19 and 20 is terminated at a neural summing device 66. Devices 66 collectively product a set of outputs labelled $OUT_1$, $OUT_2$, and so on.

Neural summing devices 66 normally comprise conventional operational amplifiers. If the difference in potential between lines 19 and 20 becomes large in one direction, further charge transfer in that direction becomes more difficult. In this way, the weighted sum of the applied input pulses acts like a type of automatic gain control for the neuron.

It is important to recognize that a fundamental advantage of the presently invented charge domain synapse cells—whether configured as a one-quadrant, two-quadrant or four-quadrant devices—is that they obviate the need for currents continuously flowing down the column summing lines in the network. Furthermore, the transfer of charge packets from one node to another closely resembles how an actual biological synapse functions. The representation of inputs as oscillatory waveforms also closely simulates the communication scheme of real biological cortices.

Another primary benefit of the inverted charge domain architecture is that it permits the realization of a synapse array having extremely high densities with little concern for power dissipation. In fact, the charge domain synapse cells described thus far permits a straightforward trade-off of speed versus power dissipation.

A further advantage is that the invented synapse cells can be easily driven by digital systems. With the voltage levels of the input pulses being predetermined and fixed, the input pulse train need only run at a set frequency and, depending on the details of the implementation, for a finite duration. Thus, interfacing an integrated circuit based on the present invention to an existing digital system can be relatively easy to implement.

Resistive Operation

With reference again to FIG. 8, resistances 69 and 70 represent the effective series resistance associated with devices 14 and 12 of FIG. 1, respectively. From a practical standpoint, these resistances are inconsequential for the one-quadrant synapse cell depicted in FIG. 1. However, for two-quadrant and four-quadrant multiplication, these series resistance elements can provide results which may be desirable. In this situation, the field-effect devices are intentionally biased in their linear region to take advantage of the series resistance element for multi-quadrant embodiments.

FIG. 10 shows an alternative embodiment of the two-quadrant multiplying synapse cell of FIG. 4. The cell of FIG. 10 includes diodes 31-34 configured substantially the same as shown in FIG. 4 between summing lines $S_1$ and $S_2$. The difference between the cell of FIG. 4 and the alternative embodiment of FIG. 10, is that capacitors 35 and 36 have now been merged into a single capacitor 82 coupled between wordline 11 and intermediate node 83. Node 83 is commonly coupled to each of diodes 31-34. This arrangement, of course, means that there are now two competing charging and discharging paths which exist at the common node 83. By redefining the weight such that devices 31 and 32 are "off" whenever devices 33 and 34 are "on" (and vice versa), proper synapse operation can be maintained. Note that this requires that all four diode elements 31-34 have a variable threshold (i.e., each must be implemented as a floating gate device).

Assuming that devices 31 and 34 of FIG. 10 are fabricated as zero-threshold devices (consistent with the description of FIG. 4) and are operated in the linear region, then the resistive effect of these devices must be taken into account in order to calculate the net charge transfer. Note that this arrangement reduces the complexity of the cell further.

A more general analysis that would treat the four diode devices of FIG. 10 as having associated resistive elements is shown in FIG. 11. In the embodiment of FIG. 11, the weight is represented by the relative resistances, rather than by the relative thresholds of the floating gate devices. Diodes 31-34 are represented as ideal, zero-threshold devices having associated resistances 31'-34'. In this case, the pattern of resistance values $R_1$, $R_2$, $R_3$ and $R_4$ represent the weights.

One possibility is to define a positive weight as $R_2 < R_3$ and $R_4 = R_1$. In adopting this convention a negative weight is defined as $R_2 > R_3$ and $R_4 = R_1$ by default. For the case where the potentials on line 19 and 20 are equal (i.e., $S_1 = S_2$), upon a low transition 24, a transient current is induced across resistors $R_2$ and $R_3$ from summing lines $S_1$ and $S_2$, respectively. Assuming that the pulse widths are sufficiently long, the current through these resistors will persist until the voltage at node 83 equals either the $S_1$ or the $S_2$ voltage. Obviously, since $R_2 < R_3$ for a positive weight, more of the transient current will flow through $R_2$.

At the arrival of low-to-high transition 25, a transient voltage is established at node 83 equal to the potential on line $S_2$ plus the voltage $V_A$. In time, the voltage at node 83 decays to the voltage at either of summing lines $S_1$ or $S_2$ through resistances $R_1$ and $R_4$. The total charge transferred to either summing column will be the same and is controlled by the resistance values $R_1$ and $R_4$, the value of capacitor 82 and the amplitude of the input pulse. The net result is that a packet of charge gets transferred from $S_2$ to $S_1$ by the end of the transient period. Similarly, for a negative weight (as defined above) a charge packet gets transferred from summing line $S_1$ to line $S_2$.

The following analysis assumes a sharp rising transient edge 25 relative to the characteristic discharge time of capacitor 82. The potential at intermediate node 83 follows the typical RC transient equation where R represents the parallel combination of $R_3$ and $R_2$. For these conditions, the equation describing the operation of the cell of FIG. 11 is given by $$V_{83} = -v(t) + V_{S1}; V_{S1} = V_{S2}$$

$$v(t) = V_A e^{-t/RC_1}; R = R_2 R_3 / (R_2 + R_3)$$

The instantaneous currents flowing through resistors $R_3$ and $R_2$ are given by $v(t)/R_3$ and $v(t)R_2$, respectively. By integrating these currents over time and taking the difference between them, the net charge transferred can be written as:

$$\text{Net } Q/\text{pulse} = \int_0^\infty \frac{v(t)}{v_2} dt - \int_0^\infty \frac{v(t)}{v_3} dt$$
$$= V_A C_1 (R_2 - R_3)/(R_2 + R_3)$$

FIG. 12 shows one possible implementation of the synapse cell of FIG. 11 using MOS devices. FIG. 12 includes a floating gate device 85 coupled in series with field-effect device 86 between summing line 20 and intermediate node 83. Also coupled between summing line 20 and node 83 is a field-effect device 91 configured as a diode. On the other side of the cell, floating gate device 88 is coupled in series with field-effect device 87 between summing line 19 and node 83. Likewise, field-effect device 90 (configured as a diode) is coupled between line 19 and node 83. Input transitions are coupled from wordline 11 to node 83 through capacitor 82. Both of the floating gate devices 85 and 88 each have their control gates coupled to a reference potential $V_{REF}$. For reasons of clarity, FIG. 12, like earlier figures, does not explicitly show programming circuitry which can be used to program and erase charge from floating gate devices 88 and 85. Note however, that the programming approach of FIG. 3 and/or FIG. 9 may be incorporated.

In the cell of FIG. 12, floating gate devices 88 and 85 control the relative resistances corresponding to resistors $R_2$ and $R_3$ of FIG. 11. Assuming that these devices are operated in the linear region, and that all devices have identical geometry and mobility constants, then the net charge can be expressed as follows $$\text{Net } Q = V_A C_1 [(V_{gs88} - V_{gs85})/(V_{gs88} + V_{gs85})]:$$

$$V_{gs} = (V_{fg} - V_{S1}) - V_{ti}$$

where $V_{gs}$ represents the gate-to-source voltage and where $V_{ti}$ is the intrinsic threshold voltage of the device. The quantity in the square brackets represents the modifiable portion of the weight. The input value is as before represented by the number of pulses or by a frequency value. Thus, the synapse cell of the present invention in its resistive embodiment also calculates a product of an input times a modifiable weight.

Note that in the special case where the average threshold of the two floating gate devices is kept constant over various weight changes, the weight becomes proportional to the difference in the threshold voltages.

As previously described, expansion to a four-quadrant multiplier can be accomplished by repeating the structure of FIG. 12. A four-quadrant synapse cell formed in this fashion is illustrated in FIG. 14. In one half of the circuit of FIG. 12, the devices corresponding to the circuit of FIG. 12 includes the suffix "a" (e.g., 91a), and in the other half of the cell, the corresponding devices are indicated by the suffix "b" (e.g., 91b). As explained previously in connection with the cell of FIG. 5, the synapse cell of FIG. 14 may be driven by a reference frequency input coupled to node 83a through capacitor 82a. The input is then provided through capacitor 82b to node 83b. In this case, the floating gate potentials are reversed in order but of the same magnitude between floating gate devices 85a and 88a. Note that devices 88a and 85b are preferably arranged with a common floating gate element, whereas devices 85a and 88b also share a common floating gate.

The advantages of using the resistive method of charge transfer include the fact that the dynamic range of the weights can be expanded to negative thresholds. Also, one of the coupling capacitors can be eliminated without having to increase the modifiable floating gate devices. Moreover, the coupling efficiency of the input line to the common node 83 can be reduced while still maintaining functionality.

FIG. 13 shows a further simplification of the two-quadrant resistive charge domain circuit discussed above. For this embodiment, the voltage potentials on summing lines $S_1$ and $S_2$ are required to be identical and constant for proper operation. In addition, the "on" resistance of devices 90 and 91 are required to be much lower than the effective resistance of floating gate device 88 and device 95. A "zero" weight is defined when devices 88 and 95 have equivalent resistances. This is to guarantee that the effect of the conductance of devices 88 and 95 can be neglected with respect to devices 90 and 91 when charging node 83. A positive weight is programmed when floating gate device 88 has a higher resistance than device 95, while a negative weight results when device 95 has a higher resistance than device 88. In other respects, the operation of the synapse cell of FIG. 13 is the same as discussed earlier in connection with FIGS. 10 and 11.

A Non-Rectifying Differential Conductance Synapse Cell

In the synapse cells discussed thus far, charge packets are transferred from one summing line to an intermediate node during one half of an input cycle. In the second half of the same cycle, the charge packet (or some fraction of it) is transferred from the intermediate node to the second summing line. Each of the embodiments described in connection with FIGS. 1-14 includes some diode element for inhibiting charge transfer in the opposite direction; that is, in the unintended direction for a particular input and programmed weight condition. In contrast, FIG. 15 illustrates a smaller, simpler synapse cell which provides charge transfer from one summing line to another in a neural network, but without the use of any diode or rectifying elements.

With reference now to FIG. 15, an input voltage pulse is supplied to the cell along wordline 117, in the same manner as described in the previous embodiments. A capacitor 113 couples the voltage transitions appearing on line 117 to the internal node 115, labeled $V_x$. In response to the voltage pulses appearing on wordline 117, field-effect devices 118 and 119 transfer charge either from summing line 112 (labeled $S_2$) to summing line 111 (labeled $S_1$) or vise versa. Field-effect device 118 is shown being coupled from line 111 to node 115, while device 119 is coupled from node 115 to line 112. The gates of devices 118 and 119 are shown being coupled to potentials $V_{G1}$ and $V_{G2}$, respectively. Although devices 118 and 119 are shown in FIG. 15 as being ordinary n-channel MOSFETs, they are preferably implemented as floating gate devices wherein the gate potentials $V_G1$ and $V_{G2}$ represent the programmed potential on the floating gate members.

One of the first things to notice about synapse cell 100 of FIG. 15 is that it comprises only two transistor devices, yet still provides full two-quadrant operation. To better understand the operating principles of cell 100 consider the following example, read in conjunction with the illustrations of FIGS. 16 and 17.

Upon the arrival of a positive-going voltage pulse on line 117, there is a corresponding increase in the voltage $V_x$ present at node 115. In other words, a potential is transferred from line 117 to node 115 by capacitor 113. Assuming that summing lines 111 and 112 are initially driven to some reference potentials (e.g. 2 volts), and that $V_{G1}$ and $V_{G2}$ are at such potentials that their respective devices 118 and 119 are conductive, any increase in the equilibrium voltage $V_x$ causes currents $I_1$ and $I_2$ to flow through devices 118 and 119, respectively. This condition is illustrated in FIG. 16. Note that in this condition, $V_x - V_s > 0$, where $V_s$ represents the reference potential on lines 111 and 112. If the gate potentials $V_{G1}$ and $V_{G2}$ are within a certain range, field-effect devices 118 and 119 operate in their linear region. For small drain-source voltages within this region, the currents $I_1$ and $I_2$ are described as:

$$I_1 = k_1(V_{G1} - V_s - V_{T1})(V_x - V_s);$$

$$I_2 = k_2(V_{G2} - V_s - V_{T2})(V_x - V_s);$$

where $k_1$ and $k_2$ are constants, and $V_{T1}$ and $V_{T2}$ are threshold voltages. Making the simplifying assumptions that $k_1 = k_2 = k$, $V_{T1} = V_{T2} = 0$, the above equations reduce to $$I_1 = k(V_{G1} - V_s)(V_x - V_s);$$

$$I_2 = k(V_{G2} - V_s)(V_x - V_s);$$

This means that a higher gate potential on one device relative to the other will result in more instantaneous current flowing through that device.

Following the positive-going input voltage transition on line 117, the transient voltage at node 115 eventually discharges. This assumes, as before, that the width of the input pulses is large enough to allow the discharge to occur. Alternatively, the effective resistance of devices 118 and 119 may be small enough to allow the discharge to take place prior to the next voltage transition, i.e. the negative-going edge of the input pulse.

Note that in the embodiments of FIGS. 1-14, diode elements were employed to prevent a discharge from occurring. The diodes discharged instantaneously to a certain threshold voltage $V_t$. As a result, the charge which flowed from one summing line to the other in these rectifying devices was due to voltage differences only. In contrast, according to the embodiment illustrated in FIGS. 15-17, current is employed. Because there are finite resistances associated with devices 118 and 119, there is an associated finite time period for discharging capacitor 113. After the leading pulse edge, a differential current discharges the capacitor such that the total charge across either of devices 118 or 119 is calculated as the integral over time of the currents $I_1$ and $I_2$, respectively.

Assuming that the circuit of FIG. 16 is allowed to settle after a positive going transition (so that $V_{s1} = V_x = V_{s2}$), the arrival of a negative-going voltage transition causes current to flow in the opposite direction through devices 118 and 119. This situation is depicted in FIG. 17 which shows current $I_3$ and $I_4$ flowing through devices 118 and 119, respectively. Currents $I_3$ and $I_4$ act to exponentially charge node 115 until the voltage $V_x = V_{s1} = V_{s2}$ prior to the arrival of the next positive-going transition. For relatively small drain-to-source voltages, field-effect devices 118 and 119 are still described by the linear approximation of the MOS characteristic. Currents $I_3$ and $I_4$ in FIG. 17 can then be expressed as $$I_3 = k(V_{G1} - V_x)(V_s - V_x);$$

$$I_4 = k(V_{G2} - V_x)(V_s - V_x);$$

As was the case with currents $I_1$ and $I_2$, there is a difference in the magnitude of currents $I_3$ and $I_4$. This difference depends upon the programmed gate potentials $V_{G1}$ and $V_{G2}$. Preferably, these gate potentials exist as electrical charge stored on a floating gate element so that the potentials $V_{G1}$ and $V_{G2}$ do not change between positive and negative-going input voltage transitions. This does not mean, however, that the charge which enters node 115 equals the charge exiting that same node during one complete input pulse cycle.

Despite the fact that transistors 118 and 119 are both conducting during the positive and negative input voltage transitions, there is still a difference in the amount of charge transferred in each direction. In other words, a net charge is transferred either from summing line 112 to summing line 111, or in the opposite direction from line 111 to line 112, depending on whether $V_{G1} > V_{G2}$ or $V_{G2} > V_{G1}$. This net charge is the result of the integration over time of all of the current components $I_1$, $I_2$, $I_3$ and $I_4$.

The reason why a charge transfer occurs in response to an input voltage pulse is because the ratio of the relative conductances of devices 118 and 119 is not constant with changing current flow directions. That is, the relative conductances are different depending on whether current flows into or out of internal node 115. The relative conductances, of course, are due to the gate potentials $V_{G1}$ and $V_{G2}$. Note that this analysis relies upon the fact that $V_{S1} = V_{S2}$, in order to prevent extraneous currents an errors in the total sum. This condition is easily met by the use of conventional operational amplifier based charge integration circuitry.

To better appreciate the operation of the present invention consider the following example with the usual simplifying assumptions (e.g., $V_{s1} = V_{s2} = V_s =$ constant, linear device operation, etc.). In this case, when $V_x$ rises above $V_s$ the current $I_1$ flowing through device 118 may be written as $$I_1 = K(V_{G1} - V_s)(V_x - V_s)$$

It is appreciated that in the above equation the current $I_1$ only depends upon $V_x$ linearly, as a power of one. If we now consider the opposite condition where $V_x < V_s$, so that current $I_3$ flows through device 118, this current can be described by the equation $$I_3 = K(V_{G1} - V_x)(V_s = V_x)$$

As can be seen, the current $I_3$ is a function of $V_x^2$. In other words, the current $I_3$ flowing through device 118 is represented as a quadratic equation.

FIG. 18 shows a plot of the current voltage characteristics of either field-effect device 118 or 119 for a certain set of gate potentials. By way of example, FIG. 18 illustrates $V_{G2} > V_{G1}$. For the condition where $V_x - V_s > 0$, both devices behave linearly, like resistors.

(Again, this assumes a relatively small value of $V_x-V_s$). In the positive direction, the difference in instantaneous current flowing in the two devices at $V_x-V_s=V_A$ is represented in FIG. 18 by the margin $\Delta_1$. This difference is current arises because of the difference in programmed gate potentials on devices 118 and 119.

When $V_x-V_s<0$, the current-voltage characteristics of devices 118 and 119 appear as a quadratic function. Because the current is now a function of square of $V_x$, the difference in conductances between devices 118 and 119 at the equivalent point $V_x-V_s=-V_A$ is larger than in the positive-going direction (i.e., $V_x-V_s>0$). Thus, the difference between currents $I_3$ and $I_4$ is larger than the difference between $I_1$ and $I_2$. This larger difference in depicted in FIG. 18 by the margin $\Delta_2$. Note that both $\Delta_1$ and $\Delta_2$ are calculated in response to a fixed amplitude voltage pulse $V_A$. During operation, this pulse is a transient pulse and is induced on node 115 by the input pulse through capacitor 113.

To repeat, it is the difference in instantaneous currents, integrated over time, that gives rise to a new charge transfer from one node to the other. The differential equations describing the transient behavior of node 115:

$$I_1 + I_2 + C\frac{dv_x}{dt} = 0; V_x > V_s$$

$$I_3 + I_4 + C\frac{dv_x}{dt} = 0; V_x - V_s$$

These equations yield respective solutions:

$$V_x - V_s = \begin{cases} (V_{XO} - V_S)e^{\frac{-2kt}{c}(\bar{V}_g - V_S)}; V_X > V_S \\ \frac{-(\bar{V}_g - V_S)}{\left(\sqrt{\frac{\bar{V}_g - V_{XO}}{V_S - V_{XO}}} e^{-\frac{2kt}{c}(\bar{V}_g - V_S)} - 1\right)}; V_X < V_S \end{cases}$$

where $V_{XO}$ = the induced initial voltage on node $V_X$ by the input pulse; and $$\bar{V}_g = \frac{V_{g1} + V_{g2}}{2}$$

By inserting these solutions into the expression for the individual currents and taking the appropriate difference, the net charge transfer is obtained to be net Q per pulse =

$$(V_{G2} - V_{G1})\frac{C}{4}\left\{\frac{V_{XO} - V_S}{\bar{V}_g - V_S} - \ln\left(1 + \frac{V_{XO} - V_S}{\bar{V}_g - V_S}\right)\right\}$$

Thus, the basic operating idea of the invention of FIG. 15 is that cell 100 stores a weight in the form of gate potentials $V_{G1}$ and $V_{G2}$—preferably in the form of floating gate potentials. This stored weight is adjusted such that net charge is transferred in one direction or the other between a pair of summing lines in the neural network. For example, where $V_{G1} > V_{G2}$ relatively more current flows through device 118 than through device 119. Since this proportion is more exagerated in the quadratic region, a net charge transferred is determined as the integral of the current over time.

Note that in the net charge equation, if the average gate voltage of devices 118 and 119 is kept constant then the weight becomes a linear function only of the difference in potentials. This means that when setting the weights for the synapse cell it is helpful to set them symmetrical about some reference level. For example, one of the two field-effect devices can have fixed potential while the other device stores the weight as a value set symmetrical about the fixed potential of the other gate. So long as the average gate potential is maintained as a constant, then the net charge transferred depends only upon the absolute value of the difference $V_{G1} - V_{G2}$.

It is also appreciated that device 118 may comprise an ordinary n-channel MOSFET, having its gate tied to a reference potential, rather than a floating gate device. For this embodiment, device 119 would compose a floating gate device which may be programmed to store a weight in the form of an electrical charge. For this kind of configuration, two quadrant operation is still obtained, although the form of the weight function is not as simple since the average gate potential will vary with the weight.

A fundamental advantage of synapse cell 100 is that it provides two-quadrant multiplication, wherein weights can be defined positively and negatively so that charge transfer can occur in two directions between summing lines $S_1$ and $S_2$. It is remarkable that this feature is achieved with so few devices, i.e., only two field-effect devices plus a capacitor. The embodiments of FIGS. 1-14 require at least four transistors to achieve the same functionality. In other respects, however, synapse cell 100 operates in the same manner as the earlier embodiments. By way of example, the input to the neural network may be coded as either a frequency or a fixed number of pulses. The cell may either be operated digitally, or as an analog device. In certain applications, the input may be coded as an amplitude; however, practitioners will appreciate that it is easier to control and transmit the input if it is coded as a frequency or fixed number of pulses, as opposed to an amplitude.

With reference now to FIG. 19, there is shown a four-quadrant synapse cell 120 comprising field-effect devices 131-134 and capacitors 124 and 125. The input voltage pulses applied to wordlines 121 and 122 are coupled to internal nodes 126 and 127, respectively, in the same manner described above. Positive and negative inputs applied along the wordlines may be defined as described in conjunction with the discussion of FIGS. 5 and 6. For either a positive or negative input pattern, charge is transferred either from summing line $S_1$ to line $S_2$, or vida versa, depending on the gate potentials of field-effect devices 131-134. These gate potentials are set by fully decoupled EEPROM cells 137 and 138. By way of example, EEPROM cell 137 includes a floating gate device 139, wherein the floating gate member is coupled to the gates of n-channel MOSFETs 131 and 134. Likewise, EEPROM cell 138 includes a floating gate device 140 which has its floating gate member coupled to the gates of devices 132 and 133. Practitioners in the art will appreciate that the n-channel devices associated with cells 137 and 138 provide a means for programming and erasing floating gate devices 139 and 140.

Another modification to the basic resistive synapse cell is shown in FIG. 20. Synapse cell 141 of FIG. 20 includes floating gate devices 144 and 145 coupled in series with n-channel field-effect device 147 between summing lines 111 and 112. Instead of an ordinary capacitor, cell 141 utilizes the gate capacitance of a field-effect device 147. In other words, input voltage pulses applies to wordline 142 are coupled to synapse cell 141 through the MOS capacitor formed by the gate capacitance of device 147.

The operating principles of synapse cell 141 are slightly different than that of those previously described. When a positive-going pulse is received on line 142, current flows through devices 144 and 145 toward summing lines 111 and 112, respectively. Thus, for a positive-going pulse edge the analysis is the same as described for earlier embodiments. The difference in the currents flowing through devices 144 and 145 is due to a difference in the gate potential of the floating gate members. (It should be understood that FIG. 20 illustrates the currently preferred embodiment, wherein devices 144 and 145 comprise floating gate devices. Alternatively, field effect devices 144 and 145 may comprise ordinary n-channel devices having their gate potentials controlled so as to store a weight. Yet another possibility is to couple the gates of devices 144 and 145 to the floating gate members of EEPROM cells, as shown in FIG. 19.)

When a negative-going pulse is received on line 142, the gate potential of device 147 drops low enough to turn that device off. This effectively disconnects devices 144 and 145 from each other. Thus, a negative-going transition divides the total accumulated charge equally between devices 144 and 145. This means that the only differential charge movement across the devices, and therefore between the summing lines, occurs when the gate of device 147 is high, i.e., in response to a high transition at the input. The total net charge transferred during an input cycle is given by the equation below (again assuming that the potential $V_{s1}=V_{s2}$).

$$\text{Net}Q = \frac{C}{4}(V_{XO} - V_S)\frac{(V_{G1} - V_{G2})}{(V_G - V_S)}$$

It should be understood that the total net charge transferred by synapse cell 141 is larger than that which occurs using an ordinary capacitor. This is because there is no differential loss of charge associated with the negative-going transition. Furthermore, any loss due to the substrate current of device 147 can be minimized by making the channel region of device 147 very short. Note also that despite the fact that the capacitance of synapse cell 141 is nonlinear—the desired functionality is still achieved.

Another way of implementing a synapse cell 141 is shown by synapse cell 150 in FIG. 21. In the embodiment of FIG. 21, only one floating gate device 145 is employed. The other field-effect device 146 comprises an ordinary n-channel MOSFET. Both devices 146 and 145 are shown having their control gates coupled to a reference programming line 149. For cell 150 the floating gate potential of device 145 is preferably set symmetrical about the threshold voltage of device 146. Thus, two-quadrant operation is realized.

Four-Quadrant Operation Using Two-Quadrant Cells

Four-quadrant operation can also be obtained using any of the two-quadrant cells described thus far. Since each of the synapse cells calculates a product ($=u_i w_i$) it is desirable to be able to define $u_i$ as both a positive and negative value. Obviously, $w_i$ must be defined as being both positive and negative; however, for each of the embodiments described, $w_i$ is already defined to be either positive or negative.

If a constant term is added to the input ($u'_i = u_i + C$), where the constant, C, has a value larger than the minimum value of $u_i$ so that the quantity $u_i + C > 0$ (for all possible values of $u_i$), then four-quadrant operation can be accomplished. The behavior of such a cell in a sum of products can be described mathematically by the distributive property as $$\text{Sum} = \sum_j u_j w_{ij} = \sum_i u'_i w_{ij} - c \sum_i w_{ij}$$

Because $w_i$ doesn't change during forward propagation, the second sum can be incorporated into a bias term. Most neutral network algorithms already use a bias term as part of the learning process. This means that a two-quadrant multiply can be implemented as a four-quadrant neural network dot product calculator. This has the potential for great savings in silicon area and complexity.

In an analogous manner, a constant Z can also be added to the weight $w_{ij} = w_{ij} + Z > 0$ for all possible values of $w_{ij}$. In this case the following equation can be written:

$$\sum_i u_i w_{ij} = \sum_i u'_i w'_{ij} = C\sum_i w'_{ij} + CZ\sum_i 1 - Z\Sigma u_i$$

The first sum term on the right of the equal sign represents a sum of one-quadrant multiplications. The second and third terms are constants which can be lumped with the bias term of a typical neural network—i.e., one bias term per summing column. The last sum term is dependent only on inputs and is thus common for an array of columns which share the same inputs. In other words, it represents a sort of input dependent global reference to all the summing columns within a rectangular synaptic array. Thus, one-quadrant or two-quadrant cells may be used to realize a fully functional neural network.

Whereas many alternations and modifications to the present invention will no doubt become apparent to the person of ordinary skill in the art after having read the foregoing description, it is to be understood that the particular embodiments and simplifying assumptions shown and described by way of illustration are in no way intended to be considered limiting. For example, although this disclosure has shown the use of floating gate devices for storing a weight pattern, other devices (such as volatile memory devices) could also be used without detracting from the spirit or scope of the present invention. Therefore, reference to the details of the illustrated circuits is not intended to limit the scope of the claims which themselves recite only those features regarded as essential to the invention.

I claim:

1. A synapse cell for transferring charge from a first summing line to a second summing line comprising:
   a first field-effect device coupled between said first summing line and an internal node;
   a second field-effect device coupled between said internal node and said second summing line;
   a first capacitor means for coupling a pulsed input signal to said internal node;

wherein said first and second field-effect devices each has an associated gate potential which governs the conductances of said devices;

said cell operating such that when a high-to-low transition of said input signal occurs, first and second currents flow from said internal node to said first and second summing lines through said first and second field-effect devices, respectively; and in response to a high-to-low transition of said input signal, third and fourth currents flow from said first and second summing lines to said internal node through said first and second devices, respectively;

wherein a net charge is transferred between said first and second summing lines in response to said low-to-high and high-to-low transitions, said net charge being determined by the relative conductances of said devices.

2. The synapse cell of claim 1 wherein at least one of said devices comprises a floating device programmable to store a weight in the form of an electrical charge.

3. The synapse cell of claim 1 wherein both said first and second devices comprise floating ate devices, each of which is programmable to store a weight in the form of an electrical charge.

4. The synapse cell of either claim 2 or 3 wherein said first and second currents are linear function of the voltage present at said internal node.

5. The synapse of claim 4 wherein said third and fourth currents are a quadratic function of the voltage present at said internal node.

6. The synapse cell of claim 5 wherein whatever said second gate potential is greater than said first gate potential, said net charge is transferred in a direction from said first to said second summing line.

7. The synapse cell of claim 1 wherein said first and second field-effect devices each comprise n-channel MOSFETs, at least one of said MOSFETs having its gate coupled to the floating gate of an EEPROM cell.

8. The synapse cell of claim 6 wherein said high-to-low and low-to-high transitions have fixed amplitudes.

9. A synapse cell providing excitatory and inhibitory connections in the neural network between an input line and a pair of summing lines, said cell comprising;

first and second field-effect devices coupled in series between said summing lines, each of said devices having a conductance controlled by its associated gate potential; capacitor means for coupling a voltage pulse present on said input line to an intermediate node coupled to said first and second field-effect devices;

wherein the low-to-high transition of said voltage pulse causes current to flow through said devices in a first direction from said intermediate node to said summing lines, and the high-to-low transition of said pulse causes current to flow through said devices in a second direction from said summing lines to said intermediate node, said resistance of each said device being relatively high in said first direction and relatively low in said second direction such that a net charge is transferred from one of said summing lines to the other in response to each said pulse.

10. The synapse cell of claim 9 wherein the magnitude of said net charge is proportional to the amplitude of said voltage pulse, the capacitance of said capacitor means, and the gate potential of each of said devices.

11. The synapse cell of claim 9 wherein at least one of said devices comprises a floating gate device programmable to store a weight in the form of an electrical charge.

12. The synapse cell of claim 9 wherein both of said devices comprise floating gate devices, each of which is programmable to store a weight in the form of an electrical charge.

13. The synapse cell of either claim 11 or 12 wherein the current flowing through said devices in said first direction is a linear function of the voltage at said intermediate node, while the current flowing through said devices in said second direction is a quadratic function of said intermediate node voltage.

14. The synapse cell of claim 13 wherein said high-to-low and low-to-high transitions have fixed amplitudes.

15. The synapse cell of claim 14 wherein said pair of summing lines are each driven to a reference potential.

16. The synapse cell of claim 13 wherein said capacitor means comprises a MOS capacitor.

17. The synapse cell of claim 16 wherein said capacitor means comprises a third field-effect device coupled in series with said first and second devices.

18. A synapse cell providing excitatory and inhibitory connections in a neural network between an input line and a pair of summing lines, said cell comprising:

first, second and third field-effect devices coupled in series between said summing lines, each of said devices having a conductance controlled by its associated gate potential;

said second field-effect device having its gate coupled to said input line, the gate capacitance of said second device coupling the voltage pulses present on said input line to said first and third field-effect devices;

wherein low-to-high transitions of said voltage pulses causes current to flow through said devices such that a net charge is transferred from one of said summing lines to the other with each said pulse.

19. The synapse cell of claim 18 wherein the magnitude of said net charge is proportional to the amplitude of said voltage pulse, said gate capacitance of said second device, and the gate potentials of said first and third devices.

20. The synapse cell of claim 19 wherein at least one of said first and third devices comprises a floating gate device programmable to store a weight in the form of an electrical charge.

21. The synapse cell of claim 19 wherein said first and third devices comprise floating gate devices, each of which is programmable to store a weight in the form of an electrical charge.

22. The synapse cell of either claim 20 or 21 wherein said low-to-high and high-to-low transitions have fixed amplitudes.

23. The synapse cell of claim 22 wherein said pair of summing lines are driven to a reference potential.

24. The synapse cell of claim 23 wherein said second field-effect devices comprises an n-channel MOSFET.

* * * * *

UNITED STATES PATENT AND TRADEMARK OFFICE
CERTIFICATE OF CORRECTION

PATENT NO. : 5,155,377
DATED : October 13, 1992
INVENTOR(S) : Hernan A. Castro

It is certified that error appears in the above-indentified patent and that said Letters Patent is hereby corrected as shown below:

Column 8, line 60,   Delete "team"  Insert in place thereof --term--

Column 18, line 1,   After "charge" Insert --will flow from node 111 to node 112. In any event, the total net charge--

Column 18, line 19,  Delete "compose" Insert in place thereof--comprise--

Column 18, line 54,  Delete "vida"  Insert in place thereof --visa--

Column 21, line 22,  Delete "ate"   Insert in place thereof--gate--

Column 21, line 31,  Delete "whatever" Insert in place thereof --whenever--

Signed and Sealed this

Twenty-sixth Day of September, 1995

*Attest:*

BRUCE LEHMAN

*Attesting Officer*    *Commissioner of Patents and Trademarks*